United States Patent [19]
Mishra et al.

[11] Patent Number: 5,409,623
[45] Date of Patent: Apr. 25, 1995

[54] FUNCTIONALIZED GRAFT CO-POLYMER AS A VISCOSITY AND INDEX IMPROVER, DISPERSANT, AND ANTI-OXIDANT ADDITIVE AND LUBRICATING OIL COMPOSITION CONTAINING SAME

[75] Inventors: Munmaya K. Mishra; Isaac D. Rubin, both of Wappingers Falls, N.Y.

[73] Assignee: Texaco Inc., White Plains, N.Y.

[21] Appl. No.: 231,590

[22] Filed: Apr. 20, 1994

Related U.S. Application Data

[63] Continuation of Ser. No. 939,743, Sep. 2, 1992, abandoned.

[51] Int. Cl.⁶ .............. C10M 151/02; C10M 149/06; C10M 149/10; C10M 147/00
[52] U.S. Cl. ................ 252/47.5; 252/51.5 A; 525/285; 525/301
[58] Field of Search .......... 252/51.5 A, 56 D, 49.6, 252/58, 45, 50, 47.5; 525/285, 301, 310

[56] References Cited

U.S. PATENT DOCUMENTS

| | | | |
|---|---|---|---|
| 4,210,414 | 7/1980 | Hansen | 8/639 |
| 4,863,623 | 9/1989 | Nalesnik | 525/232 |
| 5,075,383 | 12/1991 | Migdal et al. | 525/301 |
| 5,112,508 | 5/1992 | De Rosa et al. | 525/301 |
| 5,162,086 | 11/1992 | Migdal et al. | 525/301 |

FOREIGN PATENT DOCUMENTS 2328035  5/1977  France .

*Primary Examiner*—Vasu S. Jagannathan

[57] ABSTRACT

A derivatized graft copolymer composition comprising an ethylene alpha-monoolefin copolymer comprising about 15 to about 80 mole % ethylene, about 20 to about 85 mole % of at least one ($C_3$–$C_{10}$) alpha-monoolefin and, optionally, 0 to about 15 mole % of a polyene selected from non-conjugated dienes and trienes and having an average molecular weight ranging from about 5,000 to about 500,000; grafted with at least one ethylenically unsaturated carboxylic acid material; and derivatized with an amino-aromatic compound.

11 Claims, No Drawings

FUNCTIONALIZED GRAFT CO-POLYMER AS A VISCOSITY AND INDEX IMPROVER, DISPERSANT, AND ANTI-OXIDANT ADDITIVE AND LUBRICATING OIL COMPOSITION CONTAINING SAME

This is a continuation of application Ser. No. 07/939,743, filed on Sep. 2, 1992, now abandoned.

BACKGROUND OF THE INVENTION

This invention relates to a novel functionalized graft copolymer compound which acts as a VI improver, dispersant and anti-oxidant agent when added to an oil of lubricating viscosity.

SUMMARY OF THE INVENTION

The novel derivatized graft copolymer of the invention comprises: an ethylene alpha-monoolefin copolymer comprising about 15 to about 80 mole % ethylene, about 20 to about 85 mole % of at least one ($C_3$–$C_{10}$) alpha-monoolefin and, optionally, 0 to about 15 mole % of a polyene selected from non-conjugated dienes and trienes and having a number average molecular weight (mw.) ranging from about 5,000 to about 500,000; grafted with at least one ethylenically unsaturated carboxylic acid material; and derivatized with a amino aromatic compound of the following general formula

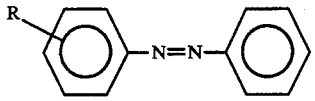

where R is $NH_2$, $CH_2$—$(CH_2)_n$—$NH_2$, $CH_2$-aryl—$NH_2$, in which n has a value from 1 to 10. In addition, the rings could be substituted by one or more or combination of groups like —$NH_2$, —Cl, —$NO_2$, —C=O(ONa), —$SO_3$Na, —$SO_3$H, —NH-aryl, —NH-arylalkyl, aryl, or a branched or straight chain $C_1$-$C_{20}$ alkyl, alkaryl, alkoxyl, alkenyl, hydroxyalkyl, or amino alkyl.

The novel lubricating oil composition of the invention comprises a major amount of an oil of lubricating viscosity and a minor amount, effective to impart viscosity index improvement, dispersancy and anti-oxidant properties to the oil, of the derivatized graft copolymer of the invention.

Concentrates of the derivatized graft copolymer of the invention are also contemplated.

DETAILED DESCRIPTION OF THE INVENTION

The polymer or copolymer substrate employed in the novel derivatized graft copolymer of the invention may be prepared from ethylene and propylene or it may be prepared from ethylene and a higher olefin within the range of ($C_3$–$C_{10}$) alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from about 5 to about 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds and up to about 30 carbon atoms in the chain. Typical trienes useful in preparing the interpolymer of the invention are 1-isopropylidene-3a,4,7,7a-tetrahydroindene, 1-isopropylidenedicyclo- pentadiene, and 2-(2-methylene-4-methyl-3-pentenyl)[2.2.1]bicyclo-5-heptene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins, which is generally conducted in the presence of a Ziegler-Natta type catalyst. Examples of satisfactory hydrocarbon solvents include straight chain paraffins having about 5–8 carbon atoms, with hexane being preferred. Aromatic hydrocarbons, preferably aromatic hydrocarbons having a single benzene nucleus, such as benzene, toluene and the like, and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler-Natta polymerization reaction.

In a typical preparation of a polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury by feeding dry ethylene and 5-ethylidene-2-norbornene to the reactor. The monomer feeds are stopped and a mixture of aluminum sesquichloride and vanadium oxytrichloride is added to initiate the polymerization reaction. Completion of the polymerization reaction is evidenced by a drop in the pressure in the reactor.

Ethylene-propylene or higher alpha monoolefin copolymers may consist of from about 15 to about 80 mole % ethylene and from about 20 to about 85 mole % propylene or higher monoolefin, with the preferred mole ratios being from about 30 to about 80 mole % ethylene and from about 20 to about 70 mole % of at least one $C_3$ to $C_{10}$ alpha monoolefin, and with the most preferred proportions being from about 50 to about 80 mole % ethylene and 20 to about 50 mole % propylene. Terpolymer variations of the foregoing polymers may contain up to about 15 mole % of a non-conjugated diene or triene.

The polymer substrate, that is the ethylene copolymer or terpolymer, is an oil-soluble, substantially linear, rubbery material having an number average molecular weight from about 5,000 to about 500,000 with a preferred molecular weight range of about 25,000 to about 250,000 and a most preferred range from about 50,000 to about 150,000.

The terms polymer and copolymer are used generically to encompass ethylene and/or higher alpha monoolefin polymers, copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. These materials which are attached to the polymer contain at least one ethylenic bond and at least one, preferably two, carboxylic acid (or its anhydride) groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The ethylenically unsaturated carboxylic acid material may be grafted onto the polymer in a number of ways. It may be grafted onto the polymer by a thermal process known as the "ene" process or by grafting in solution or in solid form using a radical initiator. The free-radical induced grafting of ethylenically unsaturated carboxylic acid materials in solvents, such as benzene is a preferred method. It is carried out at an elevated temperature in the range of about 100° C. to about 250° C., preferably 120° C. to about 190° C., and more preferably at 150° C. to about 180° C., e.g., above 160° C., in a solvent, preferably a mineral lubricating oil solution containing, e g., 1 to about 50 wt. %, preferably 5 to about 30 wt. %, based on the initial total oil solution, of the ethylene polymer and preferably under an inert environment.

The free-radical initiators which may be used are peroxides, hydroperoxides, and azo compounds and preferably those which have a boiling point greater than about 100° C. and which decompose thermally within the grafting temperature range to provide free radicals. Representative of these free-radical initiators are azobisisobutyronitrile and 2,5-dimethyl-hex-3-yne- 2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted onto molten rubber using rubber masticating or shearing equipment. The temperature of the molten material in this process may range from about 150°–400° C.

The polymer intermediate possessing carboxylic acid acylating functions is reacted with an amino aromatic compound of the following general formula

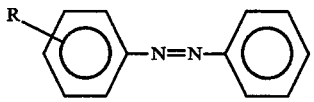

where R is $NH_2$, $CH_2\text{-}(CH_2)_n\text{---}NH_2$, $CH_2\text{-aryl---}NH_2$, in which n has a value from 1 to 10. In addition, the rings could be substituted by one or more or combination of groups like $-NH_2$, $-Cl$, $-NO_2$, $-C=O(ONa)$, $-SO_3Na$, $-SO_3H$, $-NH\text{-aryl}$, $-NH\text{-ary-}$ lalkyl, aryl, or a branched or straight chain $C_1$–$C_{20}$ alkyl, alkaryl, alkoxyl, alkenyl, hydroxyalkyl, or amino alkyl.

The preferred compounds (non limiting examples) are

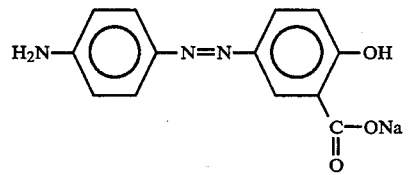

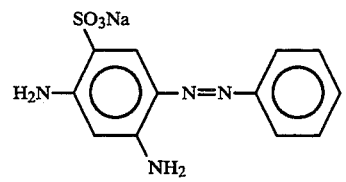

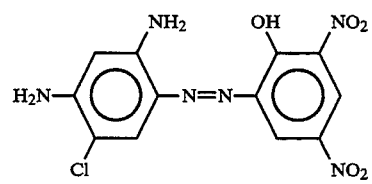

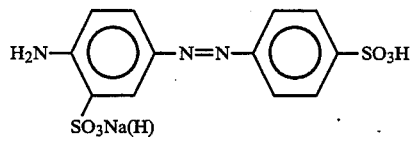

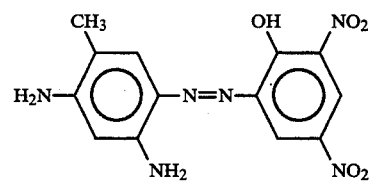

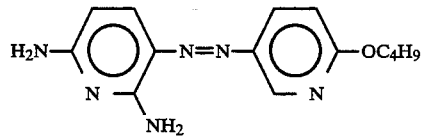

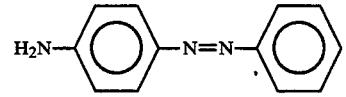

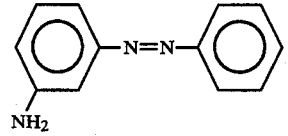

The reaction between the polymer substrate intermediate having grafted thereon carboxylic acid acylating function and the amino-aromatic compound is conducted by heating a solution of the polymer substrate under inert conditions and then adding the amino-aromatic compound to the heated solution, generally with mixing, to effect the reaction. It is convenient to employ an oil solution of the polymer substrate heated to about 140° C. to about 175° C. while maintaining the solution under a nitrogen blanket. The amino-aromatic compound is added to this solution and the reaction is effected under the noted conditions.

The novel graft and derivatized polymers of the invention are useful as an additive for lubricating oils. They are multi-functional additives for lubricants being effective in providing dispersancy, viscosity index improvement and anti-oxidant properties to lubricating oils. They can be employed in a variety of oils of lubricating viscosity, including natural and synthetic lubricating oils and mixtures thereof. The novel derivatized graft copolymers can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types as well as synthetic or semisynthetic oils or blends thereof with natural oils.

In general, the lubricating oil composition of the invention will contain the novel derivatized graft copolymer in a minor amount which is effective to provide VI improvement, dispersancy and antioxidant properties to the oil. A preferred concentration range is from about 0.1 to about 3 wt. % of the derivatized graft copolymer based on the total weight of the oil composition. A more preferred concentration range is from about 0.5 to about 1.5 wt. % of the derivatized graft copolymer based on the total weight of the oil composition.

Concentrates of the derivatized graft copolymer may contain from about 1 to about 50 wt. % of the derivatized graft copolymer of the invention based on the total weight of the concentrate in a carrier or diluent oil of lubricating oil viscosity.

The novel derivatized graft copolymer of the invention may be employed in lubricant compositions together with conventional lubricant additives. Such additives may include additional dispersants, detergents, anti-oxidants, pour point depressants, anti-wear agents and the like.

The following examples illustrate the preparation of the novel functionalized graft copolymers of the present invention.

EXAMPLE I

20 Grams of solid maleic anhydride graft polymer (rubber) in which the polymer substrate consisted of about 60 mole % ethylene and about 40 mole % propylene having a number average molecular weight of about 100,000 on which has been grafted 0.8 wt. % of maleic anhydride was dissolved in 143 grams of solvent neutral oil at 160° C. with mechanical stirring while the mixture was maintained under a nitrogen blanket. After the rubber polymer had dissolved, mixing was continued for an additional hour at 160° C. 2.8 Grams of (20%) 2-(5-chloro-2,4-diaminophenylazo)-4,6-dinitrophenol of the formula

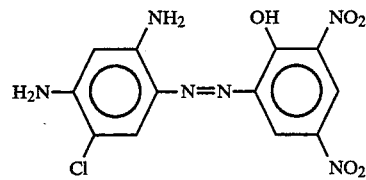

was added to the oil solution of the polymer and a reaction effected over 3 hours at 160° C. under nitrogen. The reaction mixture containing the derivatized graft polymer was then cooled and filtered. The product was analyzed by FT-IR, which showed quantitative conversion.

EXAMPLE II

20 Grams of solid maleic anhydride graft polymer (rubber) in which the polymer substrate consisted of about 60 mole % ethylene and 40 mole % propylene having a number average molecular weight of about 100,000 on which has been grafted 0.8 wt. % of maleic anhydride was dissolved in 230 grams of solvent neutral oil at 160° C. with mechanical stirring while the mixture was maintained under a nitrogen blanket. After the rubber polymer had dissolved, mixing was continued for an additional hour at 160° C. 0.9 Gram of (30%) 5-(4-aminophenylazo) salicylic acid, sodium salt of the formula

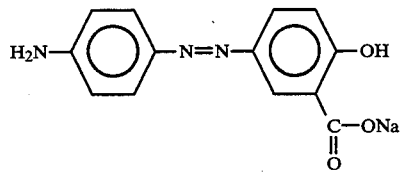

followed by 3.2 grams of low molecular weight ethylene oxide polymer (Surfonic L-46-7 manufactured by Texaco Chemical Co.) was added to the oil solution of the polymer and a reaction effected over 3 hours at 160° C. under nitrogen. The reaction mixture containing the derivatized graft polymer was then cooled and filtered. The product was analyzed by FT-IR, which showed quantitative conversion.

EXAMPLE III

30 Grams of solid maleic anhydride graft polymer (rubber) in which the polymer substrate consisted of about 60 mole % ethylene and 40 mole % propylene having a number average molecular weight of about 100,000 on which has been grafted 0.8 wt. % of maleic anhydride was dissolved in 190 grams of solvent neutral oil at 160° C. with mechanical stirring while the mixture was maintained under a nitrogen blanket. After the rubber polymer had dissolved, mixing was continued for an additional hour at 160° C. 2.5 Grams of (30%) 5-(4-aminophenylazo) salicylic acid, sodium salt followed by 9.0 Grams of low molecular weight ethylene oxide polymer (Surfonic L-24-7 manufactured by Texaco Chemical Co.) was added to the oil solution of the polymer and a reaction effected over 3 hours at 160° C. under nitrogen. The reaction mixture containing the derivatized graft polymer was then cooled and filtered. The product was analyzed by FT-IR, which showed quantitative conversion.

EXAMPLE IV

45 Grams of solid maleic anhydride graft polymer (rubber) in which the polymer substrate consisted of about 60 mole % ethylene and 40 mole % propylene having a number average molecular weight of about 100,000 on which has been grafted 0.8 wt. % of maleic anhydride was dissolved in 285 grams of solvent neutral oil at 160° C. with mechanical stirring while the mixture was maintained under a nitrogen blanket. After the rubber polymer had dissolved, mixing was continued for an additional hour at 160° C. 1.3 Grams of neat 6'-butoxy-2,6-diamino-3,3'-azodipyridine of the formula

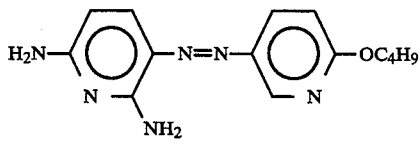

followed by 14 grams of low molecular weight ethylene oxide polymer (Surfonic L-24-7 manufactured by Texaco Chemical Co., of Houston, Tex.) was added to the oil solution of the polymer and a reaction effected over 3 hours at 160° C. under nitrogen. The reaction mixture containing the derivatized graft polymer was then cooled and filtered. The product was analyzed by FT-IR, which showed quantitative reaction.

EXAMPLE V

The novel derivatized graft copolymers of Examples I–IV were tested for effectiveness as dispersants in a lubricating oil composition together with conventional lubricant additives. Such additives may include additional dispersants, detergents, antioxidants, pour point depressants, antiwear agents, and the like. The lubricating oil used in the dispersancy test was a typical formulated lubricating oil having the composition illustrated below in Table I.

TABLE I

| Parts by Weight Component | |
|---|---|
| Solvent neutral oil (A) | 75.25 |
| Solvent neutral oil (B) | 21.64 |
| Zinc dialkyldithiophosphate | 1.22 |
| 4,4'Dinonyldiphenylamine | .39 |
| Overbased magnesium sulfonate | 1.50 |
| Silicone antifoamant | 150 ppm |
| Products of Examples I–IV | 10 |

Oil (A) had a sp. gr. 60°/60° F. of 0.858–0.868; Vis 100° F. 123–133; Pour Point 0° F. Oil (B) had a sp. gr. 60°/60° F. of 0.871–0.887; Vis. 100° F. 325–350; Pour Point +10° F. Zinc salt is a salt of mixed alcohols-isopropanol and $P_2S_5$ product. The overbased magnesium sulfonate had a TBN of 395 and is a salt of branched $C_{20}$–$C_{40}$ monoalkylbenzene sulfuric acid (MW 530–540) together with about 10% magnesium carbonate, 14% magnesium hydroxide and 4% magnesium sulfate. The dispersant properties of the derivatized graft copolymers of Examples I–IV in the formulated oils as shown below in Table II, were determined in the Bench VE Dispersancy Test (BVET). Dispersancy of the derivatized copolymers was determined relative to two references, i.e., ethylene propylene copolymer (EPM), mw. 100,000 and EPM, mw. 100,000, grafted with maleic anhydride. The derivatized graft copolymers were employed in the oil at a concentration of 1.25 wt. % polymer based upon the total weight of the oil composition. The numerical value of the test results decreases with an increase in effectiveness.

TABLE II

| BENCH VE DISPERSANCY TEST | |
|---|---|
| ADDITIVE | RESULT |
| Example I | 57 |
| Example II | 51 |
| Example III | 105 |
| Example IV | 61 |
| Maleic anhydride grafted EPM, mw. 100,00 | 190 |
| EPM, mw. 100,000 | 200 |

EXAMPLE VI

The anti-oxidant properties of the derivatized graft copolymers of Examples I, II, and IV in a lubricating oil were determined in the Bench Oxidation Test. In this test, 1.5 wt. % of the derivatized graft copolymer, based upon the total weight of the oil composition, was blended into solvent neutral oil. The mixture was continuously stirred while being heated, accompanied by bubbling with air. Samples were withdrawn periodically for analysis by Differential Infrared Absorption (DIR) to observe changes in the intensity of the carboxyl vibration band at 1710 $cm^{-1}$. As shown below in Table III, lower intensity indicates higher thermal-oxidative stability of the sample. Anti-oxidancy was determined relative to two references, EPM, mw. 100,000, and EPM, mw. 100,000, grafted with maleic anhydride.

TABLE III

| BENCH OXIDATION TEST | |
|---|---|
| ADDITIVE | RESULT |
| Example I | 2.2 |
| Example II | 13.6 |
| Example IV | 2.2 |
| EPM, mw. 100,000 | 15.0 |
| Maleic Anhydride Grafted EPM, mw. 100,000 | 27.0 |

The test results for Examples I, II and IV demonstrate substantial improvement in dispersancy and antioxidant properties due to incorporation of the novel derivatized graft copolymer of the invention in an oil composition as compared to the results obtained from known viscosity index and dispersant viscosity index improvers.

What is claimed is:

1. A lubricating oil composition comprising a major amount of an oil of lubricating viscosity and an amount of about 0.1 to about 3.0 wt %, effective to impart viscosity index improvement, dispersancy and anti-oxidant properties to the oil, of a derivitized graft copolymer composition based on the total weight of the oil composition comprising: an ethylene alpha-monoolefin copolymer comprising about 15 to about 80 mole % ethylene, about 20 to about 85 mole % of at least one ($C_3$–$C_{10}$) alpha-monoolefin and 0 to about 15 mole % of a polyene selected from non-conjugated dienes and trienes and having an average molecular weight ranging from about 5,000 to about 500,000; grafted with at least one ethylenically unsaturated carboxylic acid material; and derivatized with an amino aromatic compound; wherein the aromatic amino compound is selected from the group consisting of:

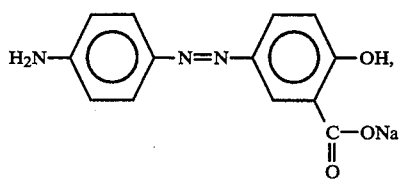

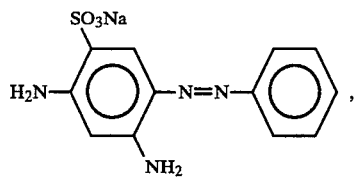

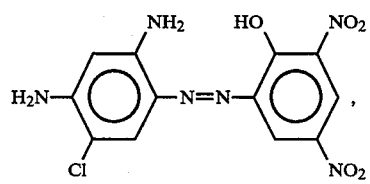

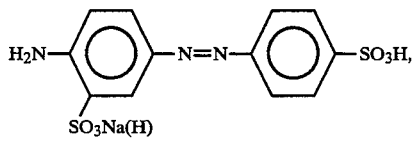

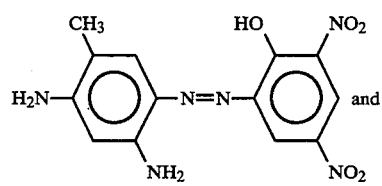

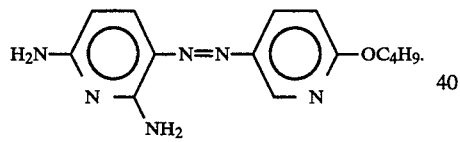

2. The lubricating oil composition according to claim 1 wherein the ethylene alpha-monoolefin copolymer has an average molecular weight ranging from about 25,000 to about 250,000.

3. The lubricating oil composition according to claim 1 wherein the ethylene alpha-monoolefin copolymer has an average molecular weight ranging from about 50,000 to about 150,000.

4. The lubricating oil composition according to claim 1 wherein the ethylene alpha-monoolefin copolymer comprises about 50 to about 80 mole % ethylene, about 20 to about 50 mole % of at least one ($C_3$–$C_{10}$) alpha-monoolefin and, optionally, 0 to about 15 mole percent of a polyene selected from non-conjugated dienes and trienes.

5. The lubricating oil composition according to claim 1 wherein the ethylenically unsaturated carboxylic acid material is maleic anhydride.

6. The lubricating oil composition according to claim 1 wherein the ethylenically unsaturated carboxylic acid material is itaconic anhydride.

7. The lubricating oil composition according to claim 1 containing from about 0.5 to about 1.5 wt. % of the derivatized graft copolymer composition based on the total weight of the oil composition.

8. The lubricating oil composition according to claim 1, wherein the derivatized graft copolymer composition has been derivatized with 2-(5-chloro-2,4-diaminophenylazo)-4,6-dinitrophenol.

9. The lubricating oil composition according to claim 1, wherein the derivatized graft copolymer composition has been derivatized with 5-(4-aminophenylazo)salicylic acid, sodium salt.

10. The lubricating oil composition according to claim 1, wherein the derivatized graft copolymer composition has been derivatized with 6'-butoxy-2,6-diamino-3,3'-azopyridine.

11. A concentrate for a lubricating oil comprising a diluent oil of lubricating oil viscosity and from about 1 to about 50 wt %, based on the total weight of the concentrate, of a derivatized graft copolymer composition comprising: an ethylene alpha-monoolefin copolymer comprising about 15 to about 80 mole % ethylene, about 20 to about 85 mole % of at least one ($C_3$–$C_{10}$) alpha-monoolefin and 0 to about 15 mole % of a polyene selected from non-conjugated dienes and trienes and having an average molecular weight ranging from about 5,000 to about 500,000; grafted with at least one ethylenically unsaturated carboxylic acid material; and derivatized with an amino aromatic compound; wherein the aromatic amino compound is selected from the group consisting of:

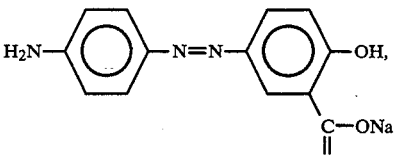

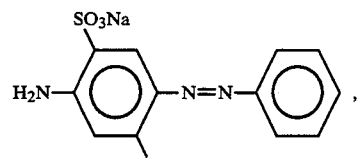

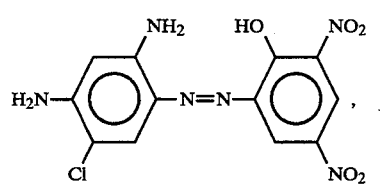

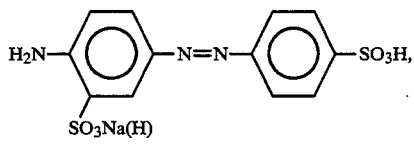

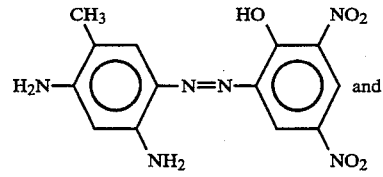

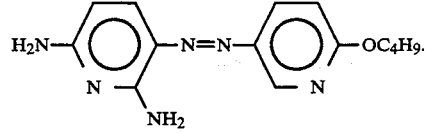

* * * * *